July 26, 1932. H. C. KOCH 1,868,751
PREPARED ROOFING AND MEANS FOR MAKING SAME
Filed Sept. 25, 1929 2 Sheets-Sheet 1
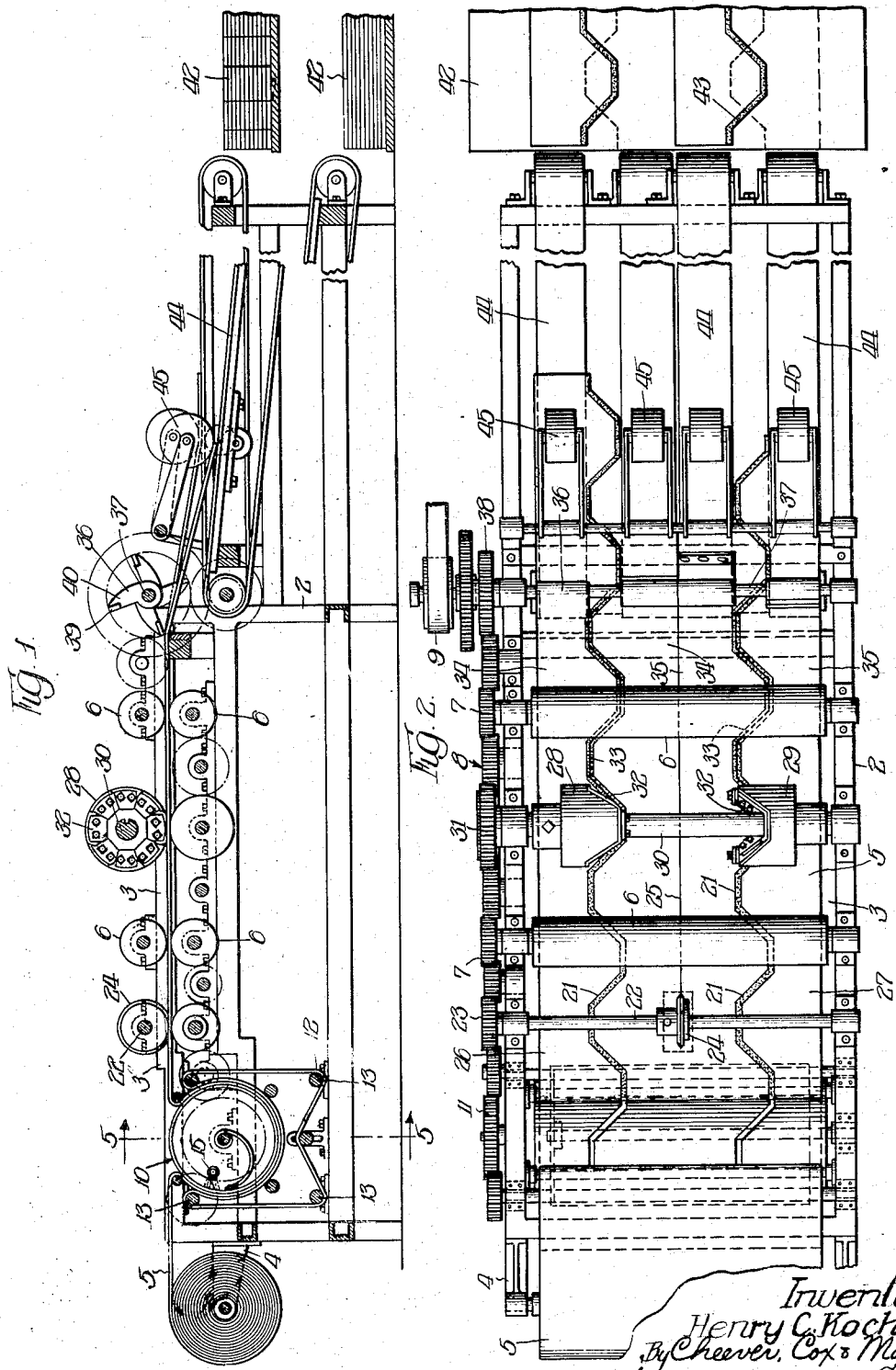
Inventor:
Henry C. Koch,
By Cheever, Cox & Moore
Attys.

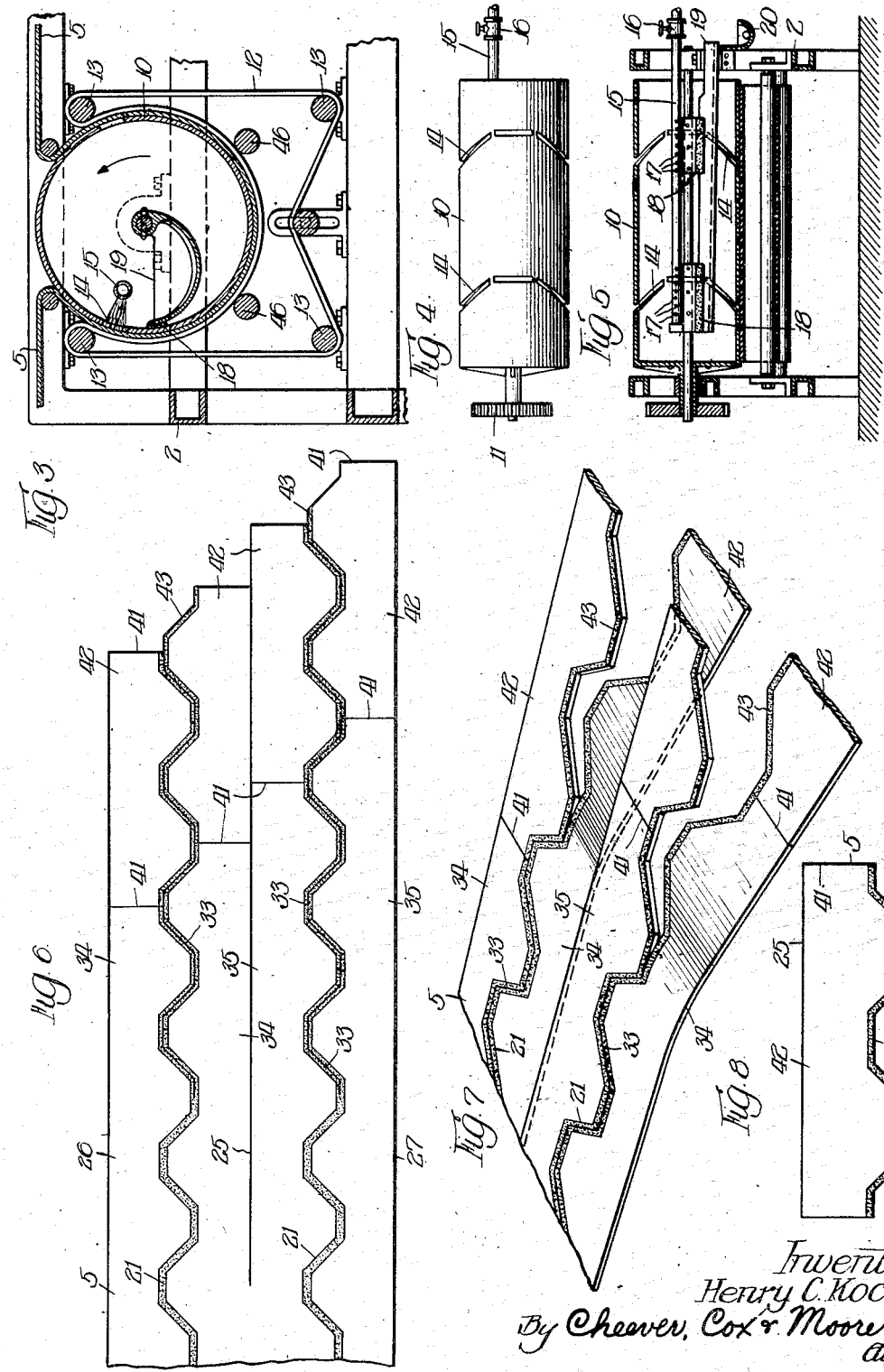

Patented July 26, 1932

1,868,751

UNITED STATES PATENT OFFICE

HENRY C. KOCH, OF CHICAGO, ILLINOIS

PREPARED ROOFING AND MEANS FOR MAKING SAME

Application filed September 25, 1929. Serial No. 395,146.

This invention relates in general to the production of shingle strips of composite material and has more particular reference to means for and method of providing a plurality of individual shingles from a continuous strip of roofing material.

This invention is an improvement of the apparatus described and claimed in my copending application, Serial No. 158,354, filed December 31, 1926.

One of the principal commercial objections to prepared roofing of this type is that the strips, when arranged on a roof or similar surface, on account of the thinness and uniform texture of the strips, present a flat uninteresting aspect and detract from the appearance of the building on which they are used. It has been proposed to accent the exposed and configurated edge of shingle strips in order to relieve the flat monotonous appearance of shingles of this type, and an important object of my present invention is to produce a shingle strip having a shaded edge portion and to provide an apparatus for producing such a shingle at low cost and in large numbers and uniform size.

Another object of the invention is to provide an apparatus for cutting a plurality of shingles from a strip and applying a shadowed vari-directional line on the strip, prior to the shingle cutting operation.

Another object is to provide a method for marking and cutting a plurality of shingles from a continuous strip of roofing material and consists in painting or marking vari-directional lines on a continuously moving strip of roofing material, slitting the strip longitudinally, then cutting the strips along a vari-directional line exactly in the center of the painted or marked line, and finally cutting each of the strips transversely and independently in regular sequence.

Another object is to provide an apparatus for and the method of providing a strip of roofing material with a shadowed line of a contrasting color, so that the design on each of the shingle strips may be accentuated when the shingle strips are assembled in position on a roof.

A further object is to provide an apparatus which will feed a strip of roofing material continuously over the bed of the machine, shade the material by spraying a paint or like substance along a vari-directional line, slit the strip longitudinally intermediate its ends, cut the two strips between the shaded portion to provide complementary strips, each of which will have shaded edges, the parts of the machine being properly synchronized so that all the shingles will be the exact same size and shape, and will have a shade line of the same breadth.

A still further object is to provide a shingle made from roofing material, such as treated felt and the like, which has a shaded marginal edge so that the individual shingles will have the appearance of being considerably thicker than the material from which they are made, or give the appearance that they are individually moulded shingles.

Other objects and advantages will appear throughout the progress of the following specification.

The invention comprises in general an apparatus which continually feeds a strip of roofing material across the bed of the machine. Feed rollers are provided for continuously feeding the strip from a roll, which is revolubly supported on one end of the machine. A printing or spraying device is interposed between the end feed rollers and the roll of material to paint or otherwise form the shaded portion in vari-directional lines on the strip. After the shade lines are formed on the strip, the strip is divided longitudinally by means of a slitter. Cutter heads are arranged forwardly of the slitter to cut each of the two strips along vari-directional lines, substantially in the center of the shade lines, so that the individual strips will have complementary flanges and recesses, each complementary edge having a shaded portion. End cutters are provided for successively cutting the strips in regular sequence.

The accompanying drawings illustrate a selected embodiment of the invention and the views are as follows:

Fig. 1 is a longitudinal sectional view showing the improved apparatus;

Fig. 2 is a detailed top plan view thereof;

Fig. 3 is a detailed sectional view taken through the machine showing the means for providing a shade line on the main strip;

Fig. 4 is a detailed elevation of the roller through which the material is sprayed for providing the shade line on the strip;

Fig. 5 is a detailed sectional view on the line 5—5 of Fig. 1;

Fig. 6 is a detailed plan view of the strip showing the manner in which the strip is shaded and cut to provide individual shingles;

Fig. 7 is a detailed perspective view of the strip showing the manner in which the cut shingles are carried from the machine; and Fig. 8 is a top plan view of an improved shingle.

The present machine shown in the drawings comprises a stand or frame 2, having a bed 3. A bracket is rigidly connected to one end of the machine and supports a roll of roofing material 5. A plurality of feed rollers 6 are revolubly mounted on the machine and are provided with gears 7, which mesh with a chain of gears 8. These chain gears are driven through the medium of a belt driven means 9.

A rotary drum 10 is supported by the frame and is interposed between the end feed roller 6 and the roll of felt material 5. This drum is provided with a gear 11, which has meshing relation with the chain of gears 8 to rotate the drum. A continuous belt 12 is carried by a plurality of rollers 13 and has contacting relation with the drum 10. This drum is provided with a plurality of slots 14, which coincide with a vari-directional line of a predetermined design according to which design the shingles are to be cut. These slots extend completely around the drum so that the design formed on the main strip 5 will be continuous. A pipe line 15 having a valve 16 is connected to a source of supply of quick drying paint, or other material, and extends inside of the drum 10, as clearly shown in Fig. 5. This pipe is provided with a plurality of apertures 17 through which the paint material passes under pressure through the pipe line 15.

The roofing material is threaded between the drum 10 and the belt 12, as clearly shown in Fig. 3, to insure the material being in close contact with the drum during the spraying operation. A wiper 18 is operatively arranged inside of the drum and has contacting relation with the inside walls thereof to wipe off the excess paint, which is sprayed through the slots 14 and onto the felt 5. A tray 19 is operatively arranged inside of the drum 10 and adjacent the wiper 18 to catch the excess paint material, which is wiped from the inside of the drum by the wiper 18. The material then flows into a drip pan 20, which is arranged outside of the frame and returns by gravity to the source of supply.

During the feeding operation of the strip 5, the felt is painted with vari-directional shaded lines 21.

A transverse shaft 22 is operatively mounted on the frame and is rotated by means of a gear 23 having meshing relation with a chain of gears 8. A slitter 24 is fixed to the shaft 22 and cuts the strip 5 along the line 25 to provide a pair of strips 26 and 27.

A pair of cutter heads 28 and 29 are mounted on a transverse shaft 30, which has a gear 31 mounted thereon. This gear has meshing relation with a chain of gears 8 to rotate the cutter heads. A plurality of removable adjustably mounted blades 32 are mounted on the heads 28 and 29 to cut the strips 26 and 27 along the line 33 of the shaded line 21 to divide the strips 26 and 27 into narrower strips 34 and 35, respectively. These cutter heads are of the type shown and disclosed in my co-pending application, Serial No. 259,770, filed March 7, 1928.

An end cutter 36 is mounted on a shaft 37, which carries a gear 38 having meshing relation with the chain of gears 8. Knives or blades 39 are mounted on arms 40 and cut the two strips 34 and the two strips 35, transversely of the strips along the lines 41, Fig. 6, to provide shingles 42 having shadowed edges 43. The blades 39 are staggered and cut each of the narrower strips successively in regular sequence.

A plurality of conveyer belts 44 having contacting relation with weighted rollers 45 are provided for carrying the cut shingles off the machine. These belts travel faster than the moving strip 6 to accelerate removal of the shingles from the machine, and to provide a slight tension on the strips prior to the end cutting operation.

The general construction of the machine and the manner in which the shingles are cut and fed from the bed of the machine, is clearly shown and disclosed in the aforesaid co-pending application, Serial No. 158,354, filed December 31, 1926.

Rollers 46 may be suitably journaled in the frame and have contacting relation with the belt 12, Fig. 3, to assist in maintaining the strip tightly against the drum.

The improved machine provides means for painting a vari-directional line or lines on a strip of shingle material, cutting the strip into other strips intermediate the shaded lines to provide a plurality of shingles, each of which has a shaded marginal edge of the same width. The slotted drum is operatively connected to the machine and geared with the main driving mechanism so that the cutter heads and other operating elements will be properly synchronized. The manner in which the quick drying material is sprayed insures that the strip is painted or shaded according to a predetermined design. The endless belt construction keeps the material tightly against the drum at all times and prevents the quick drying material from leaking about the slots and around the outside of the drum. The excess material which is sprayed is gathered and returned to the source of supply.

Changes may be made in the form, construction and arrangement of the parts without departing from the spirit of the invention, or sacrificing any of the advantages thereof, and the right is hereby reserved to make all such changes as fairly fall within the scope of the following claims.

The invention is hereby claimed as follows:

1. In a machine for making shingles from a strip of roofing material comprising a rotary drum, a belt engaging said drum, means for feeding a strip of shingle material between said belt and drum, means for spraying a quick drying material through said drum and onto said strip and providing a shadow line of a predetermined design on said strip, means inside of said drum and extending longitudinally thereof for wiping off the excess material from the inside walls of said drum, a tray under said wiping means and extending longitudinally of the drum for catching the excess material, and means for returning the material in said tray to the source of supply.

2. In a machine for making shingles from a strip of roofing material comprising means for applying a contrasting color on said strip along a vari-directional line of a pre-determined width, and means for cutting said strip longitudinally at said line.

3. In a machine for making shingles from a strip of roofing material comprising means for spraying a shadow line of a pre-determined design and width, and means for cutting said strip at the center of said line to provide strips having complementary designed and shadowed edges.

4. In a machine for making shingles from a strip of roofing material comprising a rotary drum, a belt engaging said drum, means for feeding a strip of shingle material between said belt and drum, means for spraying a quick drying material through said drum and onto said strip and providing a shadow line of a predetermined design on said strip, a wiper arranged inside of said drum and extending longitudinally thereof to wipe off excess material from the inside walls of said drum, a longitudinally inclined tray arranged under said wiper and having an end extending through the end of the drum for catching the excess material wiped from the drum by the wiper, and a receiving member under the projecting end of said tray for returning the excess material to its source of supply.

5. An apparatus for making individual shingles from a strip of roofing material comprising means for feeding the strip along a predetermined path, means for applying a plurality of colored shadow lines longitudinally of said strip and between the outer edges of said strip, means for slitting said moving strip longitudinally intermediate at least a pair of shadow lines to provide narrower strips each having at least one shadow line, and means for slitting said narrower strips longitudinally at the center of each shadow line to divide said narrower strips into still narrower strips, and a cutter for cutting each of said still narrower strips singly and transversely of the strips to form shingles of a predetermined length.

6. An apparatus for making shingles from a strip of roofing material comprising means for feeding the strip to move along a predetermined path, means for applying coloring to one face of said strip between the outer edges of said strip to provide a plurality of longitudinally extending vari-directional lines of a predetermined width, slitting means for severing the moving strip longitudinally between the shadow lines to provide two strips each having a shadow line, cutting means for cutting each strip longitudinally at the center of the vari-directional shadow line to divide said strips into a plurality of shingle strips, each shingle strip having a straight marginal edge and a vari-directional shadow edge, the width of the vari-directional shadow edge being one-half the width of the first named shadow line, and end cutting means for cutting each shingle strip singly and transversely to form shingles of a predetermined width.

In witness whereof I have hereunto subscribed my name.

HENRY C. KOCH.